United States Patent [19]

McAdams, Jr. et al.

[11] 4,138,661
[45] Feb. 6, 1979

[54] ATTITUDE INDICATOR HAVING EXPANDED SCALE

[75] Inventors: Hugh P. McAdams, Jr., Port Deposit, Md.; Ronald J. Balog, Drexel Hill, Pa.

[73] Assignee: Litton Systems, Inc., Beverly Hills, Calif.

[21] Appl. No.: 730,029

[22] Filed: Oct. 7, 1976

[51] Int. Cl.² .................................................. G08C 19/48
[52] U.S. Cl. ............................... 340/27 AT; 318/654; 340/27 NA; 340/198
[58] Field of Search .......... 340/27 R, 27 NA, 27 AT, 340/181, 198; 310/68 R, 112; 318/654, 655, 580, 629; 244/177, 180; 73/178 R

[56] References Cited

U.S. PATENT DOCUMENTS

| | | | |
|---|---|---|---|
| 2,810,119 | 10/1957 | Brown | 340/27 NA |
| 2,950,460 | 8/1960 | Seifried et al. | 340/198 |
| 3,162,834 | 12/1964 | Schweighofer et al. | 340/27 AT |
| 3,530,345 | 9/1970 | Ibrahim et al. | 310/68 R |
| 3,537,086 | 10/1970 | Andreson | 340/198 |
| 3,617,863 | 11/1971 | Espen | 340/198 |
| 3,636,428 | 1/1972 | Yanosik | 318/654 |
| 3,639,850 | 2/1972 | Brooks | 340/198 |
| 3,719,880 | 3/1973 | Boynton et al. | 318/654 |
| 3,737,885 | 6/1973 | Hedrick | 340/198 |
| 3,870,940 | 3/1975 | Espen | 244/177 |
| 3,961,212 | 6/1976 | McAdams | 310/112 |

*Primary Examiner*—John W. Caldwell, Sr.
*Assistant Examiner*—James J. Groody
*Attorney, Agent, or Firm*—Brian L. Ribando

[57] ABSTRACT

A roll and pitch servomechanism for use in an attitude indicator is shown having an expanded scale in which a nonlinear electrical circuit is combined with a nonlinear mechanical indicator to produce an accurate indication of pitch attitude over an expanded range. The circuit includes an operational amplifier circuit connected in one leg of a balancing circuit which is connected in a delta configuration across the windings of a control transformer whose windings are connected in a Y-configuration.

7 Claims, 5 Drawing Figures

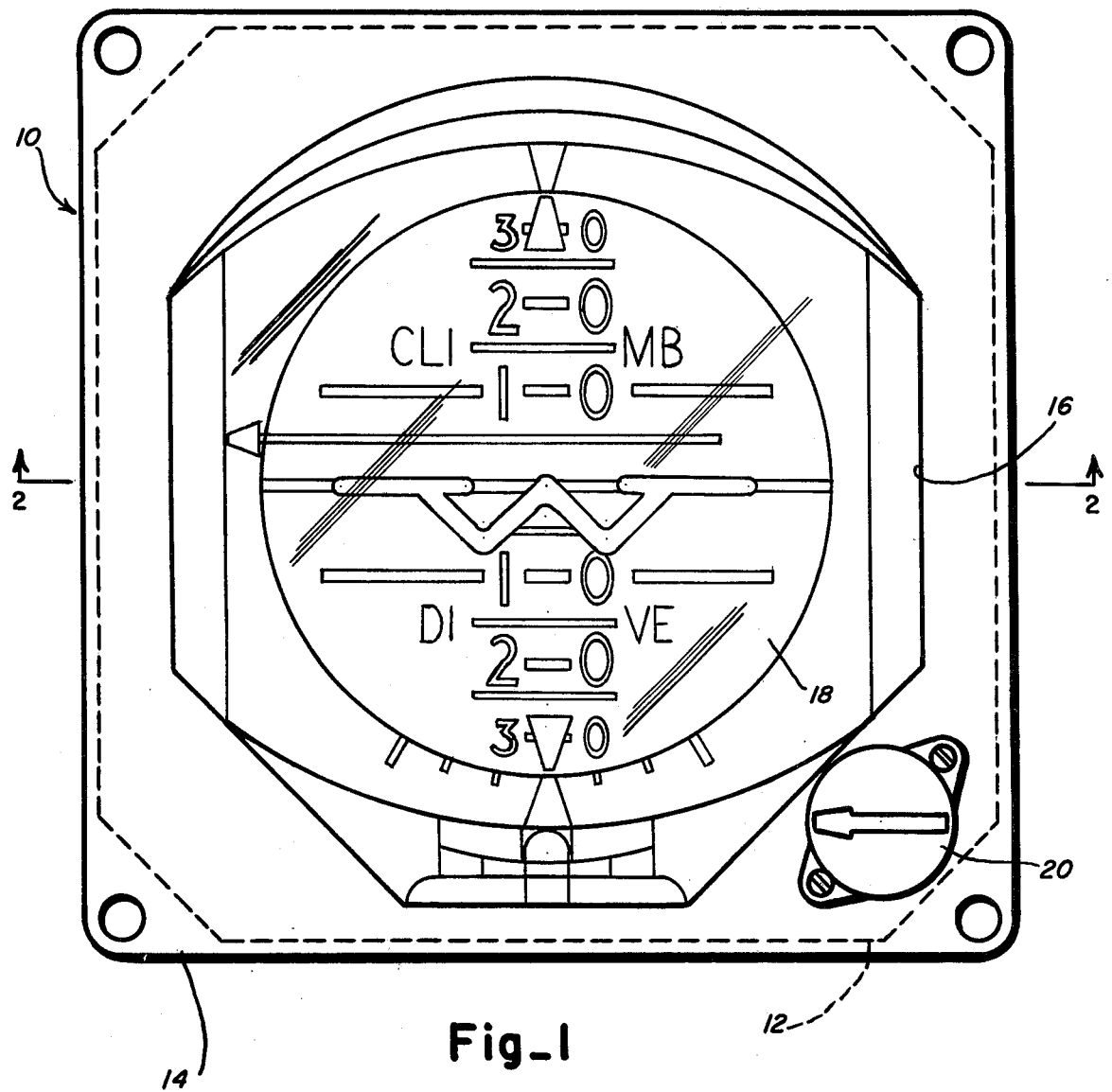
Fig_1

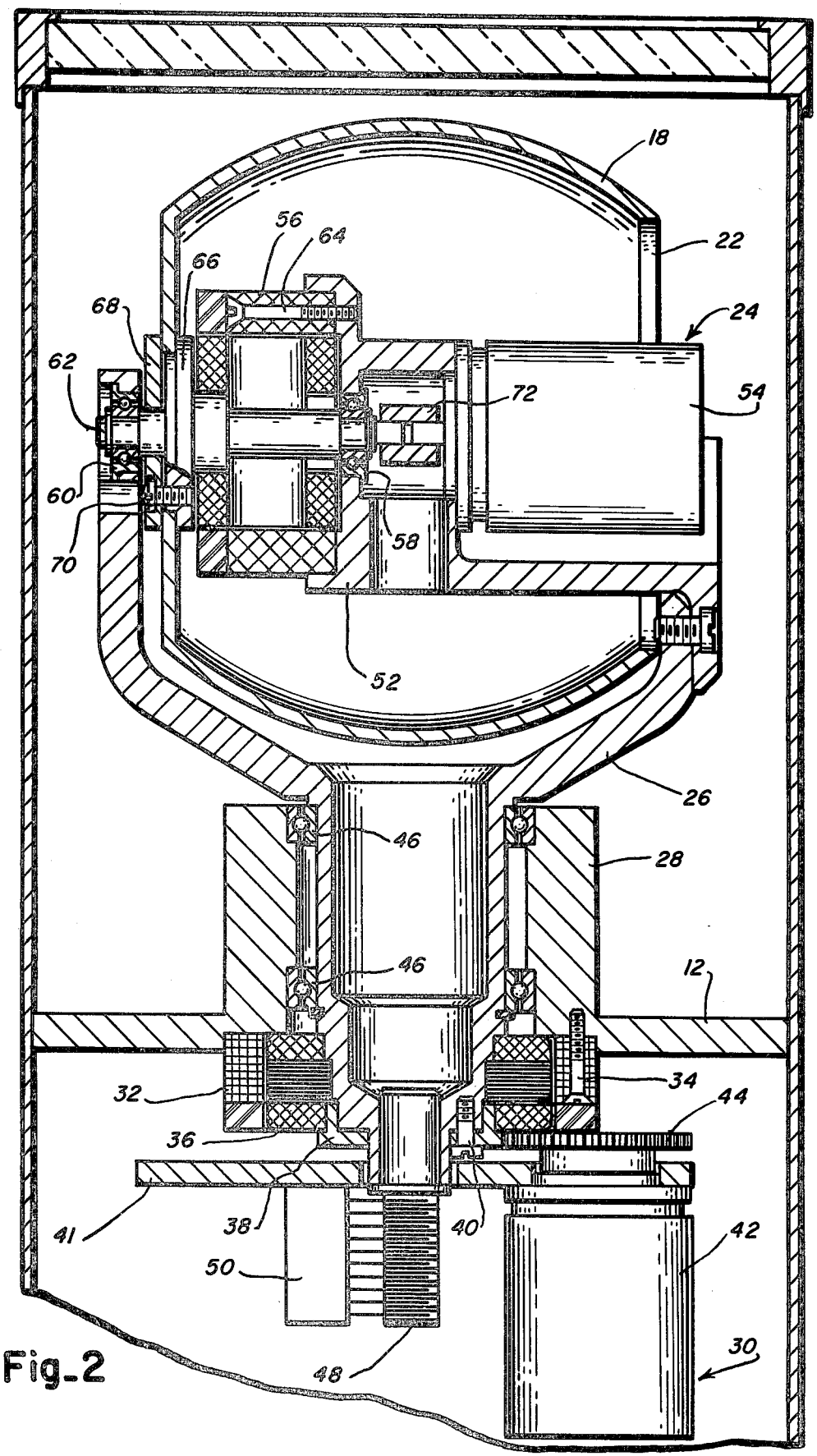
Fig_2

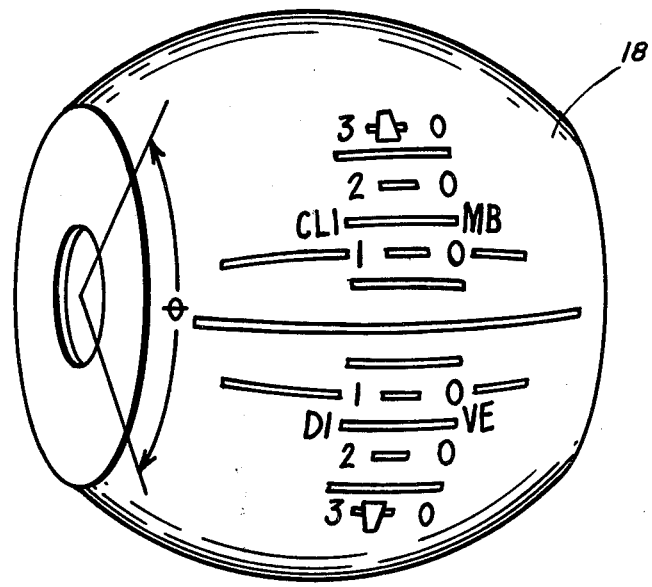
Fig_3
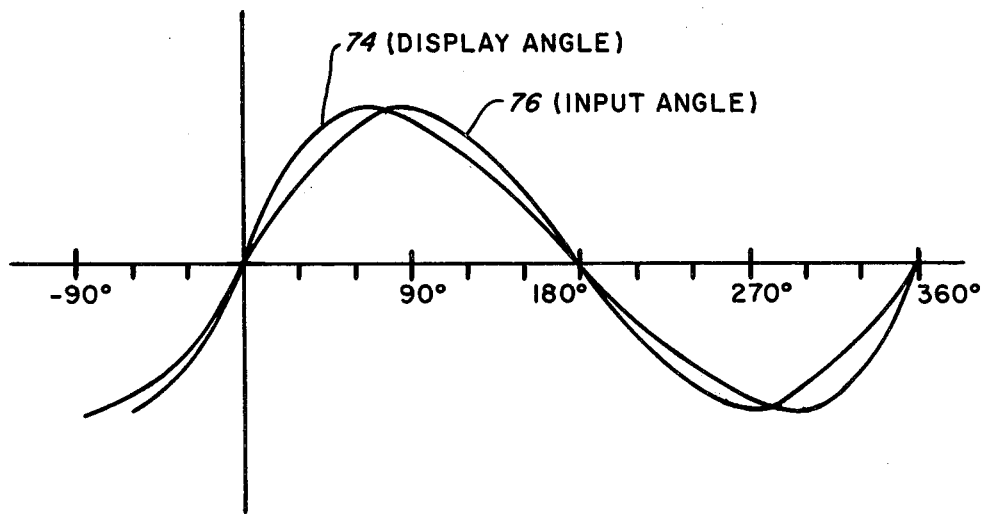
Fig_4

ATTITUDE INDICATOR HAVING EXPANDED SCALE

BACKGROUND OF THE INVENTION

This invention relates to attitude indicators and, more particularly, to an improved pitch servomechanism for use within an aircraft instrument utilizing an expanded scale to indicate attitude. In prior aircraft instruments, an indication of the pitch and roll of the aircraft is provided by a mechanical indicator in the form of a sphere having indicia on the surface thereof. The sphere in prior devices is capable of indicating a limited range of pitch due to stops which are necessary to keep the instrument synchronized. As a pilot seldom places his aircraft in a 90° dive, or a 90° climb, or flys it upside down, a limited indicating range presents no concern. With this in mind, aircraft instruments have been designed with an expanded scale in the ±30° climb and dive range for greater accuracy. Prior art instruments have relied on a gear train to provide the desired expansion. That is, the electric motor which positions the spherical indicator is coupled to the sphere through a gear train having a gearing ratio of, for example, one and one-half to one.

When a gear train is used, it is necessary to provide stops to prevent the indicator from rotating 360°, since without stops the indicator loses synchronization after one rotation. The inclusion of a gear train and the necessary stops associated with it increase the size and weight of prior art indicators. Further, stops have a tendency to stress an indicator when the aircraft in which it is mounted undergoes abrupt changes in attitude.

OBJECTS AND SUMMARY OF THE INVENTION

Accordingly, the objects of the present invention include the provision of an attitude indicator with an improved expanded scale, the provision of an indicator which may be operated with no gear train while providing an expanded scale, the provision of an indicator which may be operated without stops and which may be packaged in a smaller, lighter configuration.

In accomplishing these and other objects, a nonlinear mechanical indicator scale is matched with a nonlinear electrical circuit in an attitude indicator wherein the combination of the two nonlinear devices provides an indication which is linear or near linear over a greater range for greater resolution.

While the novel features of the present invention are set forth with particularity in the appended claims, additional objects and advantages of the invention will become apparent to those skilled in the art after careful consideration of the following specification when read in conjunction with the accompanying drawings, wherein:

BRIEF DESCRIPTION OF THE DRAWINGS

FIG. 1 is a front elevational view of an attitude indicator incorporating the present invention;

FIG. 2 is a cross-sectional view taken along line 2—2 of FIG. 1;

FIG. 3 is a perspective view of the indicator sphere of the present invention;

FIG. 4 is a curve showing the display angle of the indicator versus the electrical input angle thereof.

DESCRIPTION OF THE PREFERRED EMBODIMENT

Figure 5:
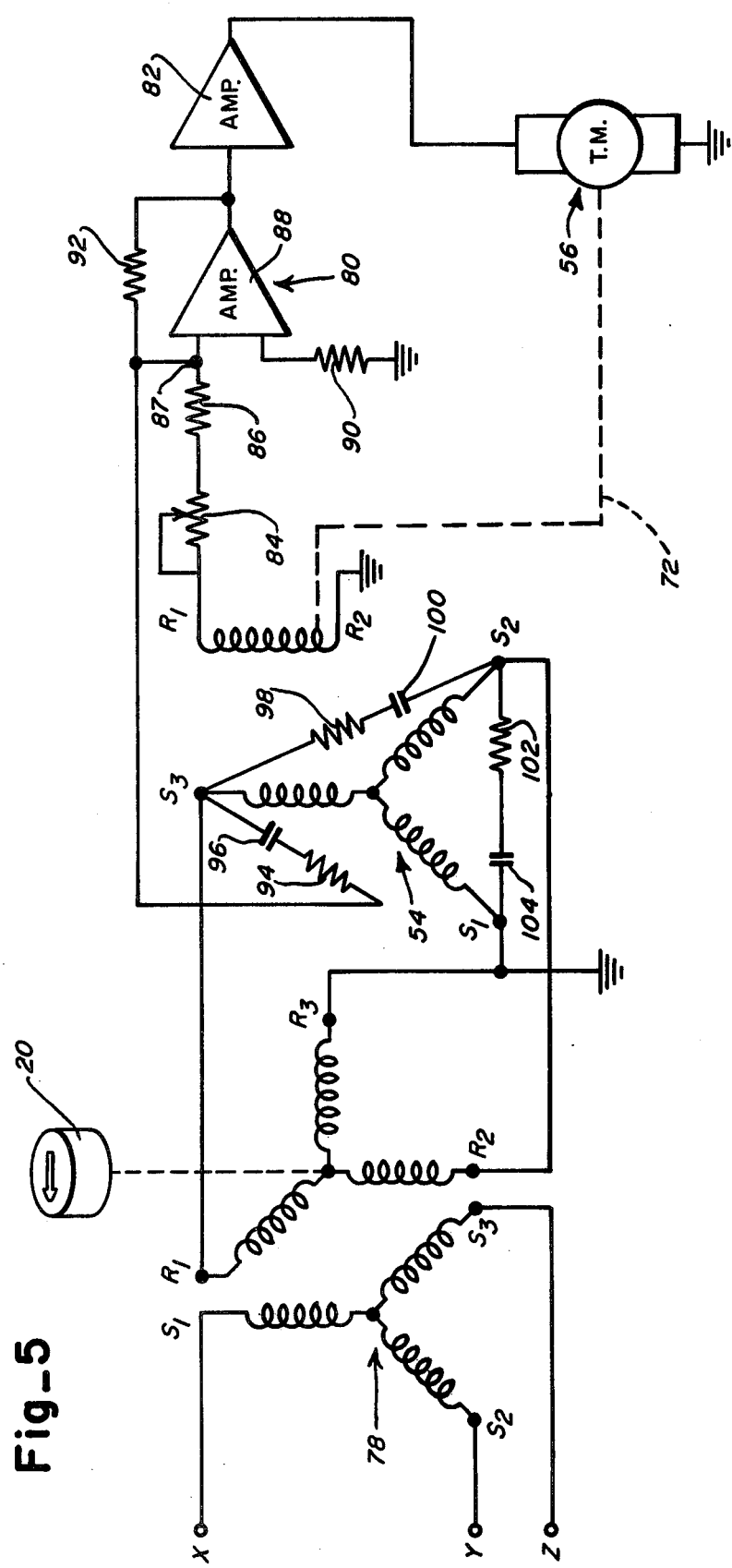
FIG. 5 is a schematic diagram showing the attitude indicator of the present invention.

Referring now to the drawings, FIG. 1 shows an attitude indicator 10 mounted within the housing 12 which may be secured within the cockpit of an aircraft by a housing flange 14 having mounting holes located in each corner. The flange 14 is provided with an aperture 16 through which may be seen the indicating devices of the attitude indicator including a spherically shaped indicator 18. The spherical indicator 18 has indicia engraved or painted on its surface which provides both pitch and roll indications to the pilot of the aircraft in which the attitude indicator is utilized. Those skilled in the art will recognize that other indications are generally associated with an attitude indicator; however, for purposes of simplicity, a description of these indicators has been omitted.

In FIG. 1, the climb and dive pitch scale on the spherical indicator 18 can be seen from 0° to +30° in the climb direction and from 0° to −30° in the dive direction. A pitch trim knob is shown at 20 for adjusting the 0 position of the spherical indicator 18. In the prior art, pitch trim is accomplished by a potentiometer. The present invention utilizes a synchro-differential motor to trim the pitch indicator.

Referring to FIG. 2, the spherical indicator 18 may be seen in cross section with the right-hand portion cut away at 22 to clear the pitch servomechanism 24. The pitch servomechanism 24 is mounted between the arms of a generally Y-shaped frame or yoke 26 whose lower cylindrical leg rotatively mounts in a bearing housing 28 formed in the main housing 12. The lowermost portion of the Y-shaped yoke 26 is attached to and driven by the roll servomechanism 30. A more complete review of FIG. 2 illustrates how both pitch and roll movement is imparted to the spherical indicator 18 to provide a pitch and roll attitude indication to the pilot.

The roll servomechanism includes a torque motor 32 having a stator mounted to the main frame 12, as by screws 34. The rotor 36 of torque motor 32 fits about the cylindrically shaped leg of the Y-shaped yoke 26 and is secured thereto by an end cap and gear 38 which is secured to the yoke 26 by screws 40. Attached to the housing 12 by standoffs, not shown, is a mounting plate 41 which mounts a synchro-control transformer 42. The control transformer 42 is provided with a shaft to which is attached a gear 44 that drives a similar gear formed on the outer periphery of the cap and gear 38. The gear ratio between gear 44 and cap gear 38 is one to one. The torque motor 32 thus provides the power to turn the Y-shaped yoke 26 mounted within the housing 28 upon bearings 46 to complete the roll servomechanism 38. Extending from the lower leg of the Y-shaped yoke 26 are slip rings 48 which are engaged by a brush block 50 to provide a wiring path to the pitch servomechanism 24.

The pitch servomechanism 24 mounts upon the Y-shaped yoke 26 between the upper arms of the Y. Extending toward the center of the Y is a mounted plate 52 which has two parallel mounting surfaces symmetrical about and parallel to the axis of the cylindrical leg of the Y-shaped yoke 26. Mounted upon the right-hand surface is a synchro-control transformer 54 with a torque motor 56 mounted on the left-hand surface. The left-hand surface mounting plate 52 also mounts a first bearing 58 while a second bearing 60 is mounted in the left-hand arm of the Y-shaped yoke 26. A shaft 62 rotatively mounts between the bearings 58 and 60 for supporting the rotor of the torque motor 56. The stator of the torque motor 56 is mounted upon the mounting plate 52, as by screws 64. Beyond the torque motor 52, the shaft 62 is flanged at 66 to provide a mounting surface for the spherical indicator 18 which fits within a shouldered portion of surface 66 and is secured thereto by a clampling ring 68 and screws 70. The control transformer 54 is directly coupled to the torque motor 56 by a coupling 72.

It will be seen that the pitch servomechanism 24 drives the spherical indicator 18 about an axis that passes through the center of bearings 58 and 60 mounted on each arm of the Y-shaped yoke 26. The roll servomechanism 30 rotates the spherical indicating scale 18 about an axis which passes through the cylindrical leg of the Y-shaped yoke. Through this configuration, the attitude indicator 10 simulates the relative position of an aircraft in which it is utilized.

Referring now to FIG. 3, the spherical indicator 18 is shown marked with indicia from ±30° in the climb and dive directions with such indicia spread over ±45° of the spherical surface, as shown by the angle $\theta$. The expanded scale wherein a display angle indicating 30° is actually displaced to 45° is normally provided by a gear train having a ratio of one and one-half to one. In the present invention, note that this is accomplished by a direct coupling between the control transformer 54 and the torque motor 56. Alternately, the coupling can be accomplished by a one to one gear ratio such as that shown for the roll servomechanism.

Further, the control transformer 54 can be coupled to the sphere 18 directly or by a one to one gear ratio, while the torque motor 56 drives the control tranformer 54 through a gear train with a step-down ratio of thirty to one, for example, to provide increased torque to the indicator.

In the preferred embodiment, the spherical indicator 18 will rotate to a 45° display angle to provide a visual indication of a 30° input angle. The display angle or expanded scale is shown in FIG. 4 by the curve 74. The normal relationship of the input angle is shown by curve 76. From the two curves in FIG. 4, it will become apparent that the curve 74, which is straighter for a longer distance on each side of zero, will provide a more accurate representation of the pitch of the attitude indicator. Further, it will be noted that curve 74 always returns to the same point after 360° of rotation. Thus, it is not necessary to provide stops within the attitude indicator of the present invention.

Referring to FIG. 5, the electrical circuit of the attitude indicator 10 is shown. In the preferred embodiment, the potentiometer utilized for pitch trim in the prior art is replaced by a synchro-differential motor 78 including stator and rotor windings connected in a Y-configuration to terminals $S_1$, $S_2$ and $S_3$ and $R_1$, $R_2$ and $R_3$, respectively. Terminals $S_1$, $S_2$ and $S_3$ are attached to input terminals X, Y and Z, to which the input angle signal is applied. The rotor of synchro 78 is manually manipulated by the pitch trim knob 20 which offsets the rotor a fixed amount to introduce the pitch trim signal to the input angle signal. Terminal $R_1$ of the synchro-differential 78 is connected to terminal $S_3$ of the control transformer 54 while terminal $R_3$ connects to ground and to terminal $S_1$ thereof. Finally, terminal $R_2$ of differential 78 connects to terminal $S_2$ of control transformer 54.

The rotor of control transformer 54 is connected via terminal $R_1$ through an operational amplifier circuit 80 to a power or servo-amplifier 82 whose output is connected to one terminal of the pitch torque motor 56. The second terminal of the torque motor 56 is connected to ground as is terminal $R_2$ of the control transformer 54. The mechanical connection between the control transformer 54 and torque motor 56 via the coupler 72 is shown by a dashed line 72 in FIG. 5.

The electrical connection between the control transformer 54 and torque motor 56 as shown in FIG. 5 without the operational amplifier circuit 80 is known in the prior art as shown in the U.S. Pat. No. 3,961,212 by Hugh P. McAdams, Jr., which is assigned to the same assignee as the present invention.

The present invention achieves an electrical scale expansion through the use of the operational amplifier circuit 80 and a balancing circuit to be described hereinbelow. The operational amplifier circuit 80 includes a trim resistor 84 serially connected between the rotor terminal $R_1$ of the control transformer 54 and a second resistor 86. Resistor 86 is connected to a junction 87 and then to one input terminal of an operational amplifier 88 whose second input terminal connects to ground via a balancing resistor 90. The output of operational amplifier 88 connects to the input of the power amplifier 82 and via a feedback resistor 92 to the first input terminal at junction 87. Junction 87 is also connected to the stator terminal $S_3$ of control transformer 54 via a resistor 94 and capacitor 96. The resistors 86, 92 and 94 determine the ratio of the expanded scale generated by the operational amplifier circuit 80.

Due to the introduction of the operational amplifier circuit 80, it is necessary to balance the input angle signal from terminals X, Y and Z which is applied to the terminals $S_1$, $S_2$ and $S_3$ of the pitch control transformer 54. This is accomplished by the utilization of the serially connected RC circuit 94 and 96 connected in a delta with similar circuits across the stator windings of the control transformer 54 which are connected, in turn, in a Y-configuration. A second leg of the delta is formed by a resistor 98 and capacitor 100 serially connected between the terminal $S_3$ and $S_2$ of the control transformer stator while a third leg is formed by resistor 102 and capacitor 104 serially connected between the terminals $S_2$ and $S_1$. It will now be seen that resistor 94 and capacitor 96 form one of three legs of a delta joining terminal $S_3$ through the junction 87 and ground to terminal $S_1$. It should be remembered that operational amplifier 88 will function to return junction 87 to a ground or zero potential by the generation of a feedback signal whose magnitude counters the signal applied to junction 87, thus closing the leg between $S_3$ and $S_1$ which is connected to ground. The operational amplifier also sums the angle input signal applied to transformer terminal $S_3$ and the control transformer output signal generated at terminal $R_1$ and applies the resulting signal to the servo-amplifier 82.

The value of resistors 86, 92 and 94 in the feedback section of the operational amplifier circuit 80 are selected to match the expanded scale on the spherical indicator 18. Through the present invention, the attitude indicator is provided with an expanded, almost linear scale in which 60° of pitch attitude is displayed over a 90° arc on the spherical indicator 18. This arrangement provides for a more accurate display of the pitch attitude of the aircraft in which the indicator 10 is used. The arrangement allows the indicator to be cycled through a full 360° pitch turn and yet return to the same location, thus eliminating the need for stops. As the indicator requires no stops, the instrument is not subject to shock which might shorten its life expectancy. Finally, the elimination of a gear train reduces the weight of the instrument, the required size and the cost.

After careful consideration of the foregoing specification and drawings, it will be apparent to those skilled in the art that further modifications of the preferred embodiment are possible. For example, the circuitry associated with the operational amplifier circuit 80 may be modified to match other desired scale expansions upon the spherical indicator 18.

The embodiments of the invention in which an exclusive property or privilege is claimed are defined as follows:

1. A servomechanism for an attitude indicator, comprising:
    a synchro-control transformer having stator windings for receiving an input angle signal and a rotor winding for producing an output signal;
    an operational amplifying circuit connected to sum said input angle signal and said control transformer output signal to produce an expanded angle signal;
    a torque motor;
    a servo-amplifier connected between said operational amplifying circuit and said torque motor to apply said expanded angle signal to said torque motor;
    a mechanical connection from said torque motor to said synchro-control transformer rotor for driving said rotor to a balanced position within the servomechanism; and
    an indicator mechanically connected to said torque motor for providing an expanded display indication of said input angle signal proportional to said expanded angle signal produced by said operational amplifying circuit.

2. A servomechanism as claimed in claim 1, additionally comprising a capacitor and resistor balancing circuit connected across each stator winding of said control transformer, and said operational amplifying circuit serially connected between one of said windings and said balancing circuit.

3. In an attitude indicator having an expanded scale display which is non-linear with respect to an indicator input angle signal, and including an operational amplifier and a torque motor for driving a display device, the improvement comprising:
    a control transformer comprising Y-configured stator windings and a rotor winding,
    means for applying an input signal to said control transformer,
    means for providing an output signal from said control transformer,
    means for summing said control transformer input signal with said control transformer output signal to provide a summed signal,
    means for applying said summed signal to said operational amplifier as an input thereto, and
    means for coupling an output of said operational amplifier to said torque motor to provide said expanded scale display by driving said display device.

4. An attitude indicator as claimed in claim 3 wherein said input signal is applied to said stator windings and said output signal is provided from said rotor winding.

5. An attitude indicator as claimed in claim 4, wherein said control transformer additionally comprises a balancing circuit connected across each leg of the Y-configured stator windings, said balancing circuit being configured in a delta with said means for summing coupled to one leg of said delta configured balancing circuit.

6. An attitude indicator as claimed in claim 5, wherein said delta configured balancing circuit includes a resistor and capacitor circuit serially connected in each leg of said delta configuration.

7. An attitude indicator as claimed in claim 3, additionally comprising:
    a synchro-differential motor having stator and rotor windings,
    means for connecting said indicator input angle signal to said stator windings, and
    means for manually offsetting said rotor windings to produce a trim output signal for manually adjusting said indicator input angle signal.

* * * * *